(12) United States Patent
Lantzsch et al.

(10) Patent No.: US 12,144,069 B2
(45) Date of Patent: Nov. 12, 2024

(54) HEATING ELEMENT FOR A SURFACE COMPONENT OF A MOTOR VEHICLE

(71) Applicant: Arte Reverse Engineering GbR, Vachdorf (DE)

(72) Inventors: Heiko Lantzsch, Eisenach (DE); Alexander Reinisch, Vachdorf (DE); Andreas Schmidt, Bad Liebenstein (DE)

(73) Assignee: Arte Reverse Engineering GbR, Vachdorf (DE)

( * ) Notice: Subject to any disclaimer, the term of this patent is extended or adjusted under 35 U.S.C. 154(b) by 685 days.

(21) Appl. No.: 17/071,962

(22) Filed: Oct. 15, 2020

(65) Prior Publication Data

US 2021/0112631 A1 Apr. 15, 2021

(30) Foreign Application Priority Data

Oct. 15, 2019 (DE) ...................... 10 2019 127 800.7

(51) Int. Cl.
*H05B 3/34* (2006.01)
*B60N 2/56* (2006.01)

(52) U.S. Cl.
CPC ........... *H05B 3/342* (2013.01); *B60N 2/5685* (2013.01); *H05B 2203/029* (2013.01)

(58) Field of Classification Search
CPC .............. B60N 2/5685; H05B 2203/02; H05B 2203/029; H05B 3/06; H05B 3/34; H05B 3/342

(Continued)

(56) References Cited

U.S. PATENT DOCUMENTS

| | | | | |
|---|---|---|---|---|
| 4,777,351 A | * | 10/1988 | Batliwalla | .............. H05B 3/146 219/541 |
| 7,053,344 B1 | * | 5/2006 | Surjan | ...................... H05B 3/34 219/217 |

(Continued)

FOREIGN PATENT DOCUMENTS

| CN | 1481655 A | 3/2004 |
|---|---|---|
| CN | 101083853 A | 12/2007 |

(Continued)

OTHER PUBLICATIONS

Chinese Office Action issued for corresponding Chinese Patent Application No. 202011103627.1, dated Aug. 5, 2022 in 11 pages including English translation.

(Continued)

*Primary Examiner* — Dana Ross
*Assistant Examiner* — James F Sims, III
(74) *Attorney, Agent, or Firm* — Knobbe, Martens, Olson & Bear LLP

(57) ABSTRACT

A heating element for a surface component is for forming an inner surface in a vehicle. The heating element has at least one film of an electrically conductive polymer material with a two-dimensionally formed electrical conductivity and also at least two electrical conductors, which are at least in certain portions spaced apart from one another and are fixed in a parallel electrically conducting manner to the electrically conductive polymer material in such a way that electrical power can be applied to the electrically conductive polymer material by way of the at least two conductors.

17 Claims, 6 Drawing Sheets

(58) Field of Classification Search
USPC .......................................................... 219/528
See application file for complete search history.

(56) References Cited

U.S. PATENT DOCUMENTS

| | | | |
|---|---|---|---|
| 8,367,986 B2* | 2/2013 | Von Wachenfeldt .. | H05B 3/146 |
| | | | 252/511 |
| 2014/0061183 A1* | 3/2014 | Li ............................ | H05B 3/34 |
| | | | 219/541 |
| 2014/0166638 A1* | 6/2014 | Irgens ...................... | H05B 3/34 |
| | | | 156/48 |

FOREIGN PATENT DOCUMENTS

| | | |
|---|---|---|
| CN | 101600271 A | 12/2009 |
| DE | 10 2012 208 534 A1 | 11/2013 |
| DE | 10 2016 105 774 A1 | 10/2017 |
| DE | 102018113449 A1 | 12/2019 |
| EP | 1 988 748 A1 | 11/2008 |
| WO | 03/088715 A2 | 10/2003 |
| WO | 2013092964 A2 | 6/2013 |
| WO | 2017/123620 A1 | 7/2017 |

OTHER PUBLICATIONS

German Office Action for German Patent Application No. 10 2019 127 800.7, dated Sep. 30, 2020 in 6 pages.
Second Office Action issued in the corresponding Chinese Patent Application No. 202011103627.1, dated Jun. 19, 2023 in 14 pages including English translation.

* cited by examiner

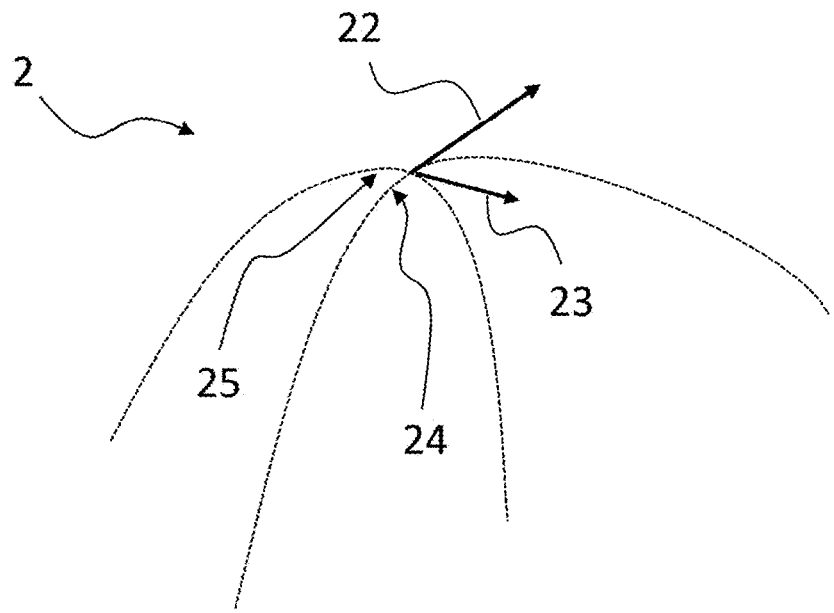
Fig. 2
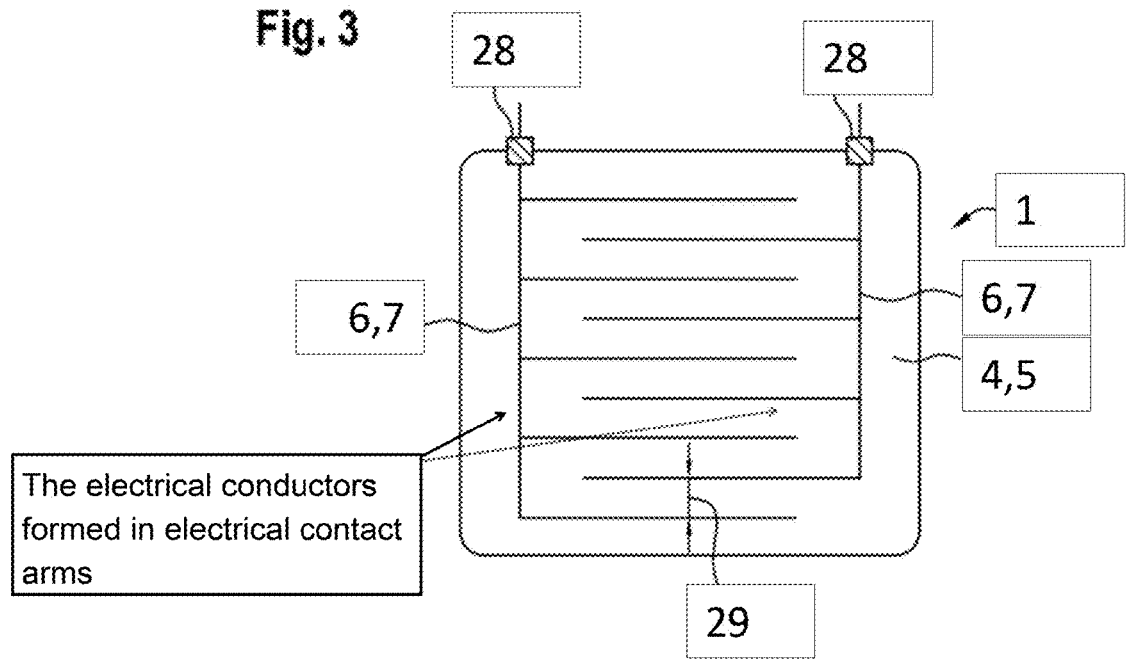

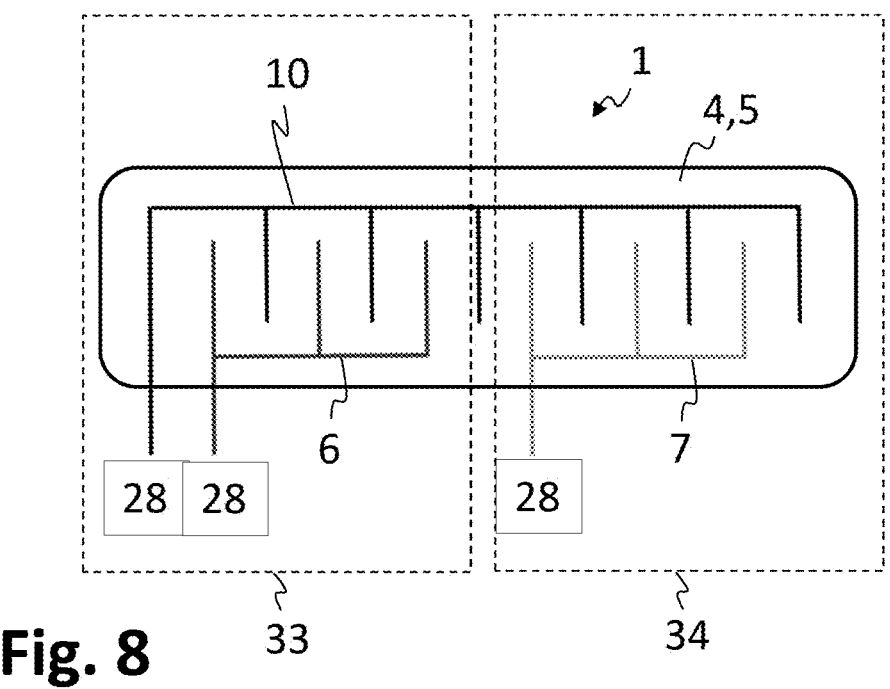

HEATING ELEMENT FOR A SURFACE COMPONENT OF A MOTOR VEHICLE

CROSS-REFERENCE TO RELATED APPLICATION

This application claims priority to German Patent Application No. 10 2019 127 800.7 filed on Oct. 15, 2019, the disclosure of which including the specification, the drawings, and the claims is hereby incorporated by reference in its entirety.

FIELD OF THE INVENTION

The invention relates to a heating element for a surface component for forming an inner surface in a motor vehicle, and also to a surface component configured with a corresponding heating element.

BACKGROUND OF THE INVENTION

It is known to heat the passenger compartment of a motor vehicle, in particular when there are low outside temperatures. Heating devices which blow heated air into the passenger compartment of the vehicle may be used for example for this. However, these heating devices often have the disadvantage that they heat the entire passenger compartment, and therefore require a relatively high energy input. In addition, there are known seat heaters that specifically heat the seat of an occupant, for example by means of metallic heating elements arranged within the seat. On the one hand, the integration of corresponding heating elements in the seat, and in particular shielding of the heating elements with respect to other components of the seat, is complex. On the other hand, it has been found in connection with the seat heaters referred to that they require a comparatively high energy input.

SUMMARY OF THE INVENTION

Against this background, the object of the present invention is to solve at least partially the problems described with respect to the prior art. In particular, it is intended to create the basis for using a wide variety of surface components in motor vehicles for forming a heatable inner surface in a motor vehicle. A suitable heating element and also a surface component configured with such a heating element are to be provided for this. The heating element and the surface component respectively contribute at least to heating a region occupied by an occupant in the motor vehicle as efficiently as possible. In addition, it is intended that the surface component and the motor vehicle can in particular be produced at low cost.

These objects are achieved by the features of the independent claims. Further advantageous refinements of the solution proposed here are specified in the dependent claims. It should be pointed out that the features set out individually in the dependent claims can be combined with one another in any desired, technologically meaningful way and define further refinements of the invention. In addition, the features specified in the claims are defined more precisely and explained in more detail in the description, with further preferred refinements of the invention being presented.

It is intended here to describe a heating element for a surface component for forming an inner surface in a motor vehicle, having at least one film of an electrically conductive polymer material with a two-dimensionally formed electrical conductivity and also at least two electrical conductors, which are at least in certain portions spaced apart from one another and are fixed in a parallel electrically conducting manner to the electrically conductive polymer material in such a way that electrical power can be applied to the electrically conductive polymer material by way of the at least two conductors.

The heating element is a component that can be incorporated in a heating system to provide a heating output. The heating element preferably has at least two or even more electrical terminals, with which an electrical voltage can be applied to the heating element, so that an electric current flows through the heating element. The heating element is designed such that the electric current that flows through the heating element is converted into heat.

It is particularly preferred that the heating element described here is suitable for being used in surface components in motor vehicles.

The surface component is in particular an interior panelling or trim for a motor vehicle, such as for example a dashboard panelling, a door panelling, a seat trim, a floor covering and/or an interior body panelling or trim. The interior body panelling or trim may be an interior roof panelling (known as a roofliner), a rear shelf and/or a removable interior bootspace lid. In such surface components, the heating element serves for ensuring heatability.

The heating element serves in particular for ensuring heatability at the visible surface of the passenger compartment component. The visible surface generally faces a vehicle passenger compartment and/or a region occupied by an occupant. In addition, the visible surface may at least partially delimit a vehicle passenger compartment.

In addition to the visible surface, the wall has an averted surface, opposite from the visible surface. This means in other words in particular that this surface, which is also referred to here for short as the "averted surface" is arranged opposite from the visible surface and oriented averted from the visible surface.

The motor vehicle may be of any type. It is particularly preferred that the heating element is used in motor vehicles that are at least at times or even exclusively driven by electrical energy. In such motor vehicles, normally no (or only little) waste heat (heat which occurs as a byproduct during the operation of the drive system of the motor vehicle) is available. For this reason, the described heating element and also surface components configured with the described heating element can be used particularly advantageously.

The heating element preferably has at least one film of an electrically conductive polymer material. The film is preferably the determinative structural element of the heating element. In other words, this means that the mechanical properties of the heating element are decisively determined by the mechanical properties of the film of electrically conductive polymer material, at least for the case where the heating element has not (yet) been applied to a carrier material.

The mechanical properties that are meant here include in particular:
  elastic deformability;
  plastic deformability;
  modulus of elasticity.

These mechanical properties are preferably formed substantially isotropically or direction-independently along the heating element. This means in particular that the elastic deformability, the plastic deformability and the modulus of elasticity are uniform in every direction of the heating element.

The at least one film of an electrically conductive polymer material preferably also makes up the greatest proportion by mass of the heating element, to be specific preferably a proportion by mass of at least 50 percent, particularly preferably at least 70 percent or even more than 80 percent.

The remaining proportion by mass of the heating element is preferably accounted for by the electrical conductors and also possibly means for connecting the electrical conductors and the at least one film.

In particular if the film is the determinative structural element of the heating element, the heating element may form a so-called film heater or a heating film. In particular, the heating film may have a (pre)defined electrical resistance. This advantageously makes it possible that the temperature of the heating film or its thermal radiation can to the greatest extent be predetermined exactly by way of the applied voltage or the current conducted through the heating film.

A two-dimensionally formed electrical conductivity is meant to mean in particular that the electrically conductive polymer material forms a conductive surface area. In particular, it does not mean materials in which linearly (one-dimensionally) formed conductors (such as wires) are incorporated to provide the conductivity, or properties thereof. In the case of such materials with incorporated conductors, normally a preferential (particularly good or high) conductivity or a particularly low electrical resistance exists in a direction parallel to the course of the incorporated linear conductors. Precisely this is not meant in the case of the two-dimensionally formed electrical conductivity.

Equally, in the case of the heating element, electrical conductors or conductor tracks (such as wires) may in particular be present in addition to the electrically conductive polymer material, which has the two-dimensionally formed electrical conductivity, for example in order to promote a current flow or current path through the electrically conductive polymer material that is to the greatest extent uniform or evened out. For example, the at least two conductors of the heating element may be fixed on the polymer material in such a way that they make it possible for electrical power to be applied to the electrically conductive polymer material as uniformly as possible, in particular as far as possible over the full surface area. This power is preferably applied over at least 50%, particularly preferably over at least 70% or even over at least 80% of the surface area that is covered by the polymer material. This can advantageously contribute to allowing the electrically conductive polymer material to be heated up to the greatest extent uniformly, in particular as far as possible over the full surface area.

A conductive surface area or a two-dimensionally formed electrical conductivity means here in particular that the electrical conductivity is formed uniformly over the polymer material. The conductive surface area runs along or parallel to the surface of the heating element or of the surface component. The conductivity of the polymer material is preferably formed uniformly in this surface area and particularly preferably has no preferential direction. This means for example that between two contact points at a certain distance on the electrically conductive polymer material there is always the same electrical resistance or conductivity through the polymer material, irrespective of how a shortest (straight) connecting line between the two points runs.

The electrically conductive polymer material may be for example an intrinsically conductive polymer (or an intrinsically conductive plastic). This means in other words in particular that the electrically conductive polymer material is such a material that is itself electrically conductive. Alternatively or additionally, it may be provided that the electrically conductive polymer material is electrically conductive due to at least one electrically conductive additive or filler, such as for instance aluminium flakes or carbon black, which is contained or embedded in a polymer (which is not necessarily itself conductive).

Poly-3,4-ethylenedioxythiophene (PEDOT, also PEDT), polystyrene sulfonate (PSS), doped polyethine (also polyacetylene, PAC) and polyaniline (PAni), and also polybutylene terephthalate (PBT) and polyamide (PA) may be mentioned for instance as examples of in particular intrinsically conductive polymers or plastics that can be used here. A preferred polymer is polyethylene (PE).

In particular to promote the electrical conductivity of the polymer material, an electrically conductive additive or filler may be integrated in the polymer material. Electrically conductive fibres may serve in particular as the electrically conductive additive or filler. This means in other words in particular that the electrically conductive polymer material has electrically conductive fibres that are embedded in a polymer matrix.

The electrical conductors are preferably metallic. Aluminium (aluminium alloys) and/or copper (copper alloys) may be used in particular as materials for the electrical conductors. The electrical conductors may be configured as wires. The electrical conductors may also be printed on, vapour-deposited or stitched on or be provided on the electrically conductive polymer material by any other method.

The electrical conductors are preferably arranged in the heating element or on the at least one film in such a way that they do not influence the mechanical properties of the film, or only insignificantly. In particular, the electrical conductors do not hinder plastic or elastic deformation of the film. This is preferably achieved by the electrical conductors preferably running exclusively in a meandering form. There are preferably no straight portions of the electrical conductors, which under (elastic or plastic) elongation of the heating element would have to be axially deformed.

The distance between the at least two electrical conductors is preferably between 2 mm [millimetres] and 5 mm.

The two electrical conductors may be formed in each case with one or more electrical contact arms, which respectively extend at least partially along the surface area of the polymer material. In particular, the contact arms are arranged for distributing the electrical power two-dimensionally over at least part of the polymer material. The two electrical conductors may for example be formed with two contact arms lying opposite (one another directly), which can be connected to different poles of a voltage source, so that a current flow through the polymer material from one contact arm to the opposite contact arm can be made possible. The contact arms (or the electrical conductors) may form a heating circuit together with the polymer material.

It is particularly advantageous if the distance of the contact arms lying opposite (one another directly) from one another deviates (locally) by a maximum of 10% from an average distance. This is particularly advantageous in particular whenever heating that is as uniform as possible is intended to be achieved. Alternatively or additionally, it may however also be provided that the distance of the contact arms lying opposite (one another directly) (of the same heating circuit) from one another deviates locally (in a targeted manner) by more than 10% from an average distance. This is particularly advantageous in particular whenever subregions in which more rapid heating is to be achieved than in other subregions are to be specifically set.

There is preferably two-dimensional contact between the electrical conductors and the electrically conductive polymer material. There are particularly preferably surface bonds between the electrically conductive polymer material and the electrical conductors in the region of contact. These bonds may be produced for example by thermal processes, preferably laminating or melting. It may additionally be of advantage for this if the electrical conductor is configured as a stranded wire and the electrically conductive polymer material can consequently adapt itself during the process to the form of the stranded wire. A further advantage for the bonding of the electrically conductive polymer material to the conductor is a surface that is as rough as possible, in order to make the contact area on a given surface area as large as possible.

It is particularly advantageous if the at least one film has a thickness of between 100 µm [micrometres] and 2000 µm.

The thickness of the films is preferably chosen such that good deformability of the heating element is ensured. At the same time, the thickness is chosen such that a uniform propagation of the electric current in the polymer material from which the film is formed takes place when an electric current is applied to the heating element. In particular, the at least one film is so thick that an unused field region of an electric field between the two electrical conductors is as small as possible, whereas the film is at the same time so thin that an unused region of the film is likewise as small as possible. An unused region of the film is a region in which there is no electric field in the polymer material of the film when voltage is applied to the at least two electrical conductors. An unused field region is an (imaginary) region to the side of the film in which, although there is an electric field when there is a voltage across the at least two electrical conductors, there can then no longer be any polymer material in this region. Providing a smallest possible unused field region and at the same time a smallest possible unused film region is a conflict of aims that can be resolved by a thickness of the films or of the polymer material that is adapted to the distance between the at least two electrical conductors.

It is also advantageous that the electrically conductive polymer material has PTC properties and has a switching temperature in a range between 40° C. and 150° C.

Particularly preferably, the switching temperature lies in a range between 40° C. and 70° C., that is to say in the lower of the ranges mentioned here. Such a low switching temperature allows uniform heating of the heating element in a homogeneous temperature range to be realized without excessive amounts of electrical energy being required for operating the heating element. At the same time, thermal spots (locally very confined regions with very high temperatures) can be successfully avoided. Such thermal spots are problematic in particular when the heating element is used for heating the passenger compartment of a motor vehicle.

It is also advantageous if the at least two electrical conductors are applied to a carrier film that is connected to the film.

A carrier film serves in particular during the production of the described heating element for keeping the electrical conductors in a defined position in relation to one another. A preferred production process for producing the heating element comprises providing the electrical conductors with the carrier material and subsequently applying the at least one film of electrically conductive polymer material.

In preferred configurational variants, the carrier film consists at least in a significant proportion (for example more than 50 percent or even more than 80 percent) of PE (polyethylene).

In further configurational variants, the carrier film consists at least in a significant proportion (for example more than 50 percent or even more than 80 percent) of a polyimide. A polyimide is a plastic that has an imide group. Polyimides include polysuccinimide (PSI), poly bismaleimide (PBMI), polyimide sulfone (PISO) and polymethacrylimide (PMI).

Polyimides are often not meltable and chemically very resistant (even with respect to many solvents). Furthermore, polyimides are heat resistant and radiation resistant. These properties make polyimides particularly suitable for the carrier film described. A polyimide-based carrier film can reduce the influence of the carrier film on the electrical and thermal properties of the heating element.

In addition, it is advantageous if the carrier film has a plurality of interruptions.

Preferably, more than 50 percent, particularly preferably even more than 70 percent or 80 percent, of the surface area of the carrier film is interrupted. In configurational variants, the carrier film has the effect of hindering the forming and/or of the electrical conductivity from the electrical conductors into the films, respectively into the polymer material. These hindrances can be reduced or minimized by interruptions.

The interruptions are particularly preferably configured such that the reliable and exact positioning of the at least two electrical conductors is not impaired. Preferably, the interruptions are arranged such that at least partially webs of the material of the carrier film run between the interruptions in the manner of a truss. For example, a pattern of hexagonal interruptions is possible, so that a honeycomb-shaped pattern of the webs of the material of the carrier film is obtained. Such a pattern is particularly rigid in processing and the at least two electrical conductors can still be dependably positioned even with (relatively) large interruptions and (relatively) narrow webs.

Webs between interruptions that are made of polyimide are particularly torsion-resistant.

In particular, carrier films of which a significant proportion consists of polyimides may be provided with interruptions without the mechanical properties of the carrier film being adversely influenced too much.

It is also advantageous if the at least two electrical conductors are stitched, sewn, glued, laminated, rolled or applied by a printing process to the carrier film. These are particularly preferred methods for fixing the electrical conductors on the carrier film.

In preferred variants, the at least two electrical conductors are stitched, sewn or applied by a printing process at least partially on a first side and/or at least partially on a second side of the carrier film. In the case of these variants, a film of electrically conductive polymer material is preferably applied on both sides of the carrier film.

For stitching on the at least two electrical conductors, preferably at least one auxiliary thread is used, which connects the electrical conductor to the carrier film. When they are stitched on, the at least two electrical conductors are fastened on the carrier film with the aid of the at least one auxiliary thread. The auxiliary thread penetrates the carrier film (at regular intervals), in order to realize fastening on the carrier film.

When the at least two electrical conductors are sewn on, it may however also be helpful not to use an auxiliary thread. In this case, the at least two electrical conductors preferably penetrate themselves (at regular intervals), in order to realize fastening on the carrier film.

Gluing on may be realized by a multiplicity of locally confined adhesive connections (in particular in the form of spots or beads) between the carrier film and the electrical conductors. In the case of electrically nonconductive adhesive connections, the adhesive can also preferably be applied flat on the carrier film.

When applying the electrical conductors to a carrier film by rolling, it may be advantageous to carry this out under uniform pressure at a preferably constant speed. Under the additional influence of temperature, this can then also be referred to as laminating. Preferably, a two-dimensionally electrically conductive conductor may be applied to the carrier film and the structure of the at least two electrical paths subsequently created. This may be performed for example by chemical processes such as etching or mechanical processes such as milling.

This can in other words also be described by saying that an electrically conductive material for the conductor is first (fixedly) applied to the carrier film over the full surface area and, in a later step, parts of the material are removed again, in order to determine the form and/or the course of the conductor.

It is also advantageous if the at least two electrical conductors are stitched, sewn, glued, laminated, rolled or applied by a printing process to at least one film. In such configurational variants of the heating element, preferably no carrier film to which the at least two electrical conductors are applied is provided. In other words, the electrical conductors are in this connection (fixedly) applied directly to the film.

In the case of this modified variant of the heating element, there is no carrier film. The film of electrically conductive polymer material itself acts here as a carrier film. For the fastening process for fastening the at least two electrical conductors on the film of electrically conductive polymer material, the same methods as for fastening on a carrier film (sewing, stitching, printing, gluing, laminating, rolling) may be used. The relevant statements made above also apply to the fastening to a film of electrically conductive polymer material.

In addition, in particular in the case where an adhesive that is used is itself electrically conductive, adhesive bonding of the electrical conductors on the film over the full surface area can be realized. Here, the conductive layer is subsequently removed in heating regions, by for example chemical processes such as etching or mechanical processes such as milling.

It is also preferred if the at least two electrical conductors at least in certain portions run in the direction of a normal to the heating element or the film. Preferably, the at least two electrical conductors run along a path that regularly alternates back and forth between different parallel planes along the surface area. This construction allows an actual length of the at least two electrical conductors to be much greater than a length along the plane. When there is an elongation of the heating element and of the films, the course of the at least two electrical conductors in the normal direction can change, in order to compensate for the elongation in the direction of the surface area.

It is also preferred if the heating element is formed by at least two films of electrically conductive polymer material, which are arranged one on top of the other, the at least two electrical conductors being arranged between the two films.

In this way, electric current can be transferred particularly advantageously from the at least two electrical conductors into the electrically conductive polymer material. In particular, a particularly great proportion of an electric field that is produced when there is a voltage between the two electrical conductors runs through the electrically conductive polymer material. There is a particularly small unused film region (regions of the films through which there is no electric current as a result of a voltage across the electrical conductors). In addition, there is a particularly small unused field region (regions adjacent to the films in which a voltage across the electrical conductors results in an electric field, in which however there is no longer any electrically conductive polymer material).

Also to be described here is a heatable surface component for the passenger compartment of a motor vehicle having at least one described heating element, the heating element being connected over its surface area to a carrier material.

Apart from the described heating element, the surface component preferably comprises a carrier material, which is press-formable and which has been brought into the desired form of the surface component by means of press-forming. This carrier material comprises particularly preferably a fibre material, which takes the form of a flat starting material and has been brought into the desired form by means of press-forming, with fibres of the carrier material also being made to start melting and subsequently solidified during the forming, in order that the fibre material remains in the desired form after the press-forming.

It is particularly preferred that the carrier material and the heating element are at least in certain portions fused or welded to one another in the surface component. It is most particularly preferred that the at least one film of the electrically conductive polymer material and the carrier material are at least in certain portions fused or welded to one another. It is particularly preferred that the heating element or the polymer material is fused or welded to the carrier material over the full surface area.

The surface component preferably has a visible surface which is oriented towards the passenger compartment (when the surface component is fitted in the passenger compartment of a motor vehicle). Taking the passenger compartment as a starting point, the carrier material is preferably located behind the heating element. Thus, the heating element is arranged particularly close to the passenger compartment and heat generated by the heating element gets into the passenger compartment with smallest possible losses.

In preferred configurational variants of the surface component, the decorative layer is also preferably arranged on the side intended for orientation towards the passenger compartment. This decorative layer may for example be made of leather or synthetic leather. The decorative layer may likewise be fused or welded to the heating element or to the at least one film of electrically conductive polymer material.

The advantages and design features explained further above of the described heating element can be transferred as applicable to the surface component. This also applies conversely to the particular advantages and design features of the surface component explained below, which can be transferred and applicable to the heating element.

As already described further above, the surface component is in particular an interior panelling or trim for the motor vehicle, such as for example a dashboard panelling, a door panelling, a seat trim, a floor covering and/or an interior body panelling or trim. The interior body panelling or trim may be for example an interior roof panelling (known as a roofliner), a rear shelf and/or a removable interior bootspace lid. The surface component has in particular a visible surface, which is visible from the passenger compartment of the motor vehicle.

The surface component preferably forms a wall for an interior panelling with a wall thickness. This wall thickness is preferably filled to a certain proportion by the heating element.

It is particularly advantageous for the surface component if the heating element takes a 3D form in the surface component.

A 3D form is meant here to mean a complex surface form. The 3D form extends three-dimensionally in space. Preferably, the 3D form is at least in certain portions curved in two directions.

As already described further above, the heating element is deformable. It is particularly preferred that the heating element is also plastically deformable, in order that it can assume a 3D form of the carrier material or the heating element and the carrier material can together assume the 3D form in a production process for producing the surface component. With particular preference, the heating element in the surface component follows curvatures that have a radius of curvature of less than 10 mm [millimetres] in a first direction and of less than 60 mm [millimetres] in a second direction, which runs perpendicularly to the first direction.

Preferably, the at least two electrical conductors are arranged in or on the heating element such that, when there is a deformation of the heating element in the surface component in such a way that the curvature radii mentioned occur in a first direction and in a second direction, no undesired contact of the at least two electrical conductors with one another occurs.

It is also advantageous for the surface component if the heating element can be divided into a number of segments, which can be individually or jointly controlled.

For this purpose, preferably more than two electrical conductors are provided. Particularly preferred are in this case a plurality of pairs of in each case two electrical conductors. Each pair of two electrical conductors is intended for supplying current to a portion of the heating element.

It is also conceivable that at least three electrical conductors are provided, two conductors of the same polarity acting together with a common third conductor. This can in other words also be described in particular by saying that there is an identical electrical conductor for a number of pairs in different heating segments. This can on the one hand contribute to reducing the complexity of integration in the heating system, on the other hand it can make it possible to achieve different output states by way of the switching/control of the heating segments.

It is preferred in this connection if two conductors which each define a (heating) segment, and are in this case arranged for example adjacent to and/or at a distance from one another, respectively overlap (at least in certain portions) with a third conductor. In this connection, the third conductor consequently extends at least partially through both (heating) segments. The overlaps may be formed by contact arms of the conductors, which respectively extend away from main strands of the conductors running substantially parallel to one another (in the direction towards the main strand of an opposite conductor).

In addition, it is advantageous for the surface component if the heating element has a directed heat emission to the passenger compartment, for example by the averted side being insulated.

In preferred configurational variants, an insulating material is provided on the side of the surface component that is averted from the inner side.

It is also advantageous for the surface component if the carrier material is a fibre mat consisting of synthetic fibres or natural fibres.

With a carrier material produced as a fibre mat of natural fibres, an ecologically particularly sustainably produced surface component can be provided.

According to a further aspect, a method for producing a heating element (described here) for a surface component is provided for forming an inner surface in a motor vehicle, comprising at least the following steps:
 a) providing at least one film of an electrically conductive polymer material with a two-dimensionally formed electrical conductivity,
 b) providing at least two electrical conductors,
 c) connecting the at least one film to the at least two electrical conductors, the at least two electrical conductors at least in certain portions being spaced apart from one another and fixed in a parallel electrically conducting manner to the electrically conductive polymer material in such a way that electrical power can be applied to the electrically conductive polymer material by way of the at least two conductors.

The method may be supplemented for example by adding to a method for producing a surface component for forming an inner surface in a motor vehicle the following step d), to follow on after steps a) to c):
 d) carrying out a joint forming operation on the at least one film and the at least two electrical conductors.

Optionally, connecting of the heating element to a carrier material and/or a decorative layer may also be performed between steps c) and d). These may then particularly preferably be brought into a form together with the film and the conductors in step d).

The advantages and design features of the described heating element and/or of the described surface component that are explained further above can be applied and transferred to the method described here. Conversely, this also applies to the particular advantages and design features of the method explained here, which can be applied and transferred to the heating element and/or the surface component.

BRIEF DESCRIPTION OF THE DRAWINGS

The solution presented here and its technical context are explained in more detail below on the basis of the figures. It should be pointed out that the invention is not intended to be restricted by the exemplary embodiments shown. In particular, unless explicitly stated otherwise, it is also possible to extract partial aspects of the substantive matter explained in the figures and combine them with other constituent parts and/or findings from other figures and/or the present description. In the figures:

FIG. 2: schematically shows a schematic representation of a curved surface of a surface component, FIG. 3: schematically shows an overall view of a described heating element.

DETAILED DESCRIPTION OF THE PREFERRED EMBODIMENTS

Figure 1A:
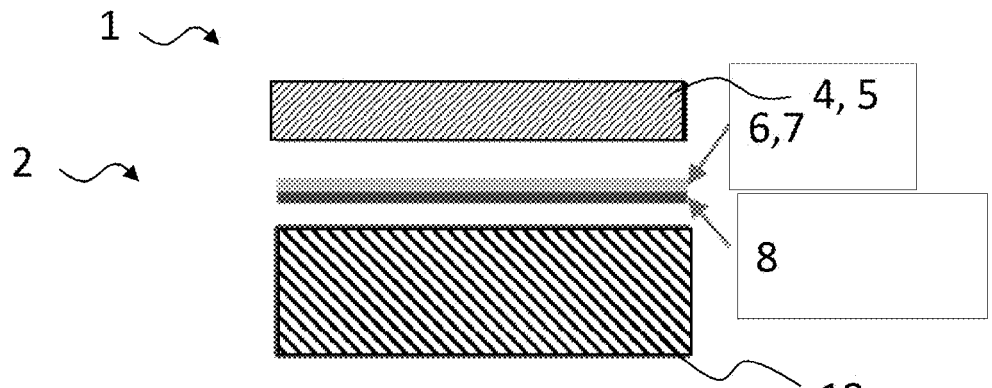
FIG. 1a to FIG. 1f: schematically show various variants of the construction of a described heating element.

FIG. 1a shows a first configurational variant of a described heating element 1 together with a carrier material 19 to which the heating element 1 can be applied in order to form a surface component 2. The heating element 1 has a film 4 of electrically conductive polymer material 5. This film 4 is fastened on a carrier film 8, the carrier film 8 bearing two electrical conductors 6, 7. The electrical conductors 6, 7 are printed on the carrier film 8.

Figure 1B:
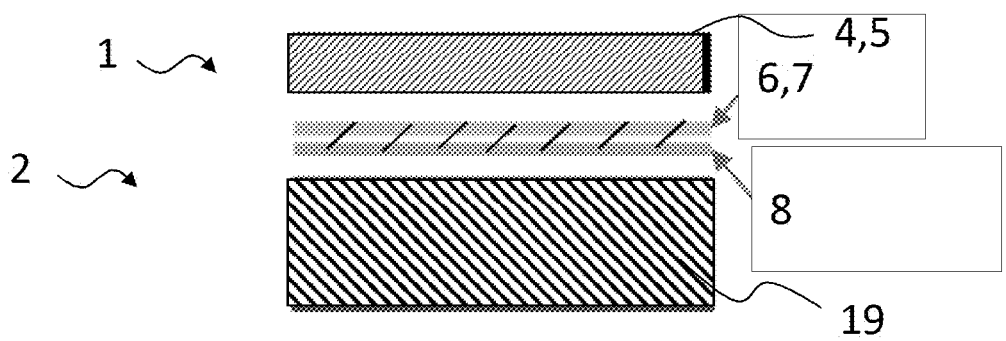

FIG. 1b shows a second configurational variant of a described heating element 1 together with a carrier material 19 to which the heating element 1 can be applied in order to form a surface component 2. The heating element 1 has a film 4 of electrically conductive polymer material 5. Electrical contacts 6, 7 are stitched on the carrier film 8.

Figure 1C:
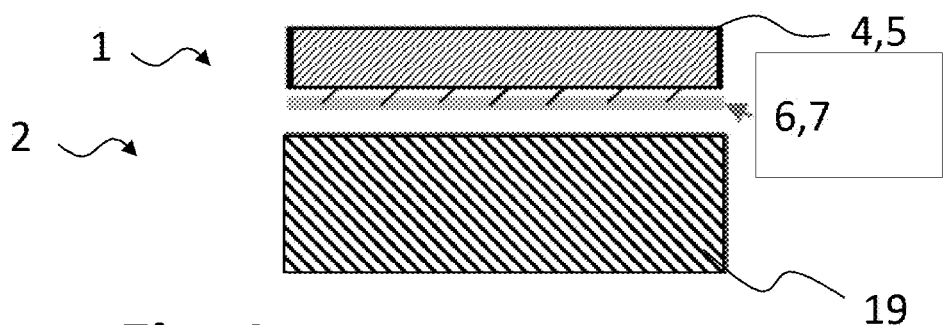

FIG. 1c shows a third configurational variant of a described heating element 1 together with a carrier material 19 to which the heating element 1 can be applied in order to form a surface component 2. The heating element 1 has a film 4 of electrically conductive polymer material 5. Electrical contacts 6, 7 are stitched directly on the film 4 of electrically conductive polymer material 5. There is no carrier film.

Figure 1D:
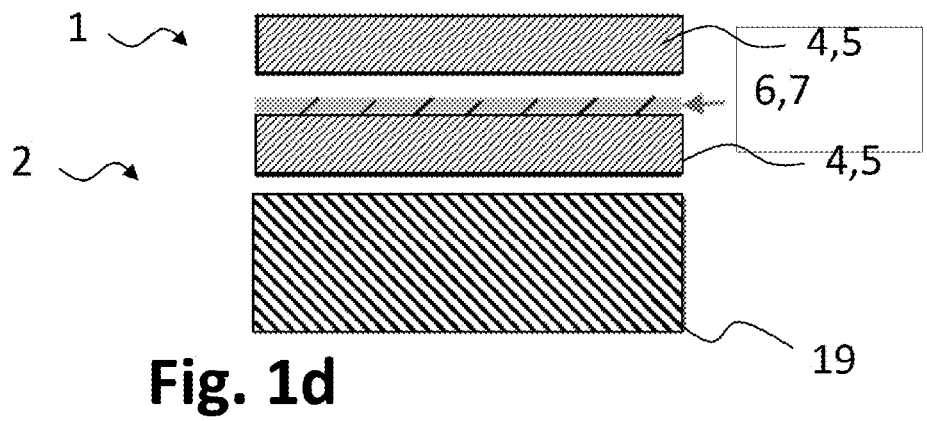

FIG. 1d shows a fourth configurational variant of a described heating element 1 together with a carrier material 19 to which the heating element 1 can be applied in order to form a surface component 2. The heating element 1 has two films 4 of electrically conductive polymer material 5, which enclose the electrical contacts 6, 7 on both sides. The electrical contacts 6, 7 are stitched on one of the films 4 of electrically conductive polymer material 5.

Figure 1E:
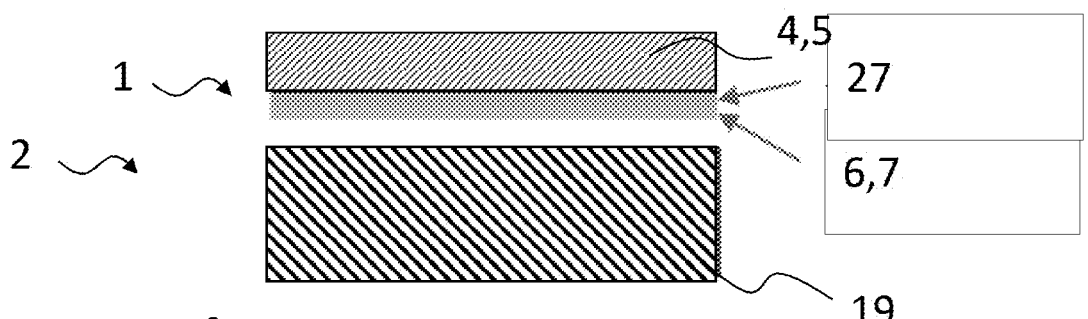

FIG. 1e shows a fifth configurational variant of a described heating element 1 together with a carrier material 19 to which the heating element 1 can be applied in order to form a surface component 2. The heating element 1 has a film 4 of electrically conductive polymer material 5. Electrical contacts 6, 7 are glued with an adhesive 27 directly on the film 4 of electrically conductive polymer material 5. There is no carrier film.

Figure 1F:
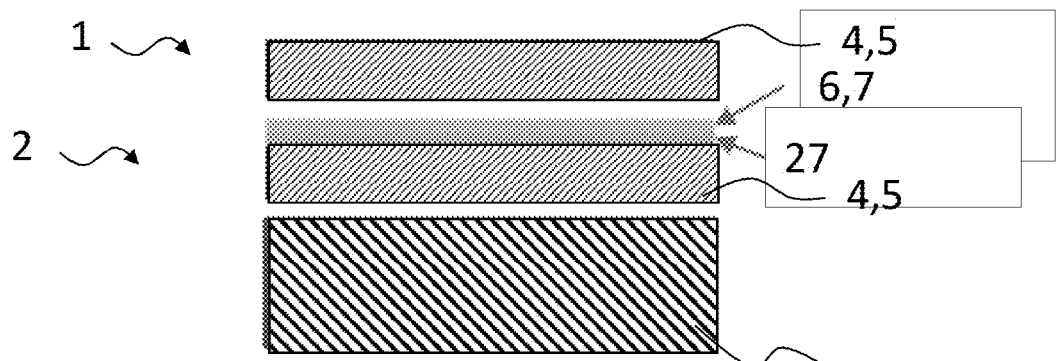

FIG. 1f shows a sixth configurational variant of a described heating element 1 together with a carrier material 19 to which the heating element 1 can be applied in order to form a surface component 2. The heating element 1 has two films 4 of electrically conductive polymer material 5, which enclose the electrical contacts 6, 7 on both sides. The electrical contacts 6, 7 are glued on one of the films 4 of electrically conductive polymer material 5 with an adhesive 27.

The construction of a heating element 1 according to FIG. 1a to FIG. 1f is of course also possible without the carrier material 19, which merely serves for illustrating how the heating element 1 can contribute to the production of the surface component 2.

FIG. 2 illustrates a curvature of a surface component 2. A heating element arranged in the surface component 2 must also follow this curvature. For this, the heating element must be correspondingly oriented. The curvature can be described in two directions. To be specific, in a first direction 22 and a second direction 23, arranged along the surface of the surface component 2 perpendicularly thereto. In the first direction 22, the surface component 2 has a first curvature 24. In the second direction 23, the surface component 2 has a second curvature 25. The particular challenge for the surface component 2 or the heating element arranged therein is that there are curvatures in two directions and not just in one direction. As a result, there is a complex deformation of the heating element with intensive local elongation of the heating element. The heating element is designed such that, in spite of this elongation, no local contacts occur between electrical conductors in the heating element.

FIG. 3 shows an overall view of a described heating element 1. The electrical conductors 6, 7, which are arranged in a pattern and are at a distance 29 from one another, can be seen. During heating, the electric current flows along the distance 29 through the film 4 of electrically conductive polymer material 5. The electrical conductors 6, 7 can be electrically contacted by way of terminal contacts 28. With the terminal contacts 28, the heating element 1 can be connected to a power supply (not shown).

Figure 4:
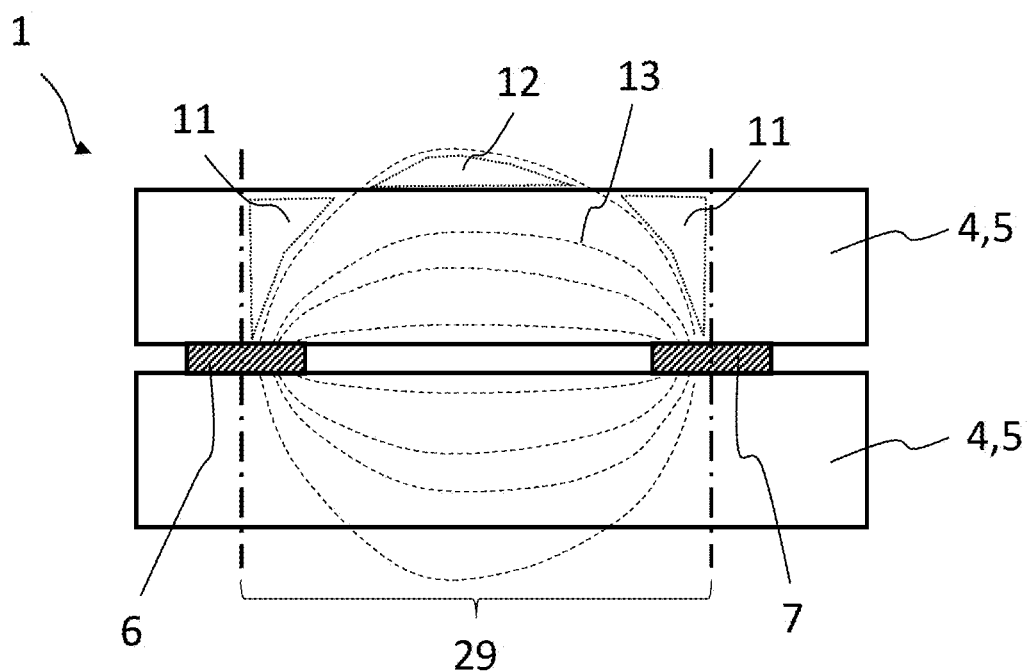
FIG. 4: schematically shows an electric field in a heating element to which current is supplied.

FIG. 4 shows the field lines 13 of an electric field in a described heating element 1 to which current is supplied. A first electrical conductor 6 and a second electrical conductor 7, which are arranged at a distance 29 from one another in the heating element 1, can be seen. The electrical conductors 6, 7 are surrounded on both sides by films 4 of electrically conductive polymer material. It can be seen that the field lines 13 run in a region outside the films 4. This region is referred to as the unused field region 12. In this region, an electric field generated by the electrical conductors 6, 7 is not used for generating thermal energy. In addition, there are regions of the films 4 that are not penetrated by field lines 13. These regions are referred to as unused film regions 11. Although there is electrically conductive polymer material 5 here, it is not possible for current to be supplied in order to use the electrically conductive polymer material 5 for heating. It is preferred if the ratio of the distance 29 to the thickness of the electrical conductors 6, 7 and to the thickness of the films 4 of electrically conductive polymer material 5 is chosen such that there is the fullest possible utilization of the electrically conductive polymer material 5, with at the same time a small unused field region 12.

Figure 5:
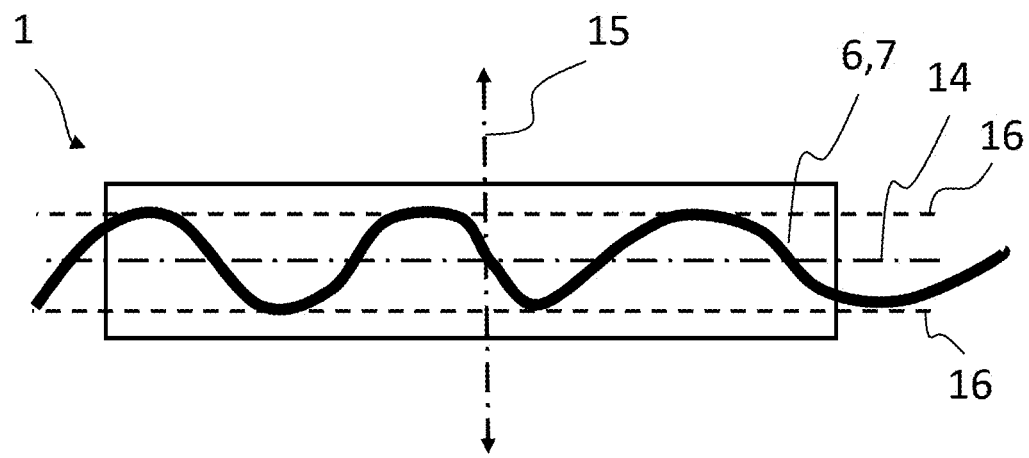
FIG. 5: schematically shows a cross section through a described heating element.

FIG. 5 shows a cross section through a described heating element 1, in which the course of the electrical conductors 6, 7 is shown in a normal direction 15 in relation to the heating element 1 or to a surface area 14 of the heating element 1. Depicted are two "imaginary" parallel planes 16, which are parallel to the surface area 14 of the heating element. Preferably, the electrical conductors 6, 7 alternate (for example in a meandering form) between these planes. Thus, the actual length of the electrical conductors 6, 7 can be realized as very much greater than the extent of the heating element 1 along the surface area 14. This makes it possible that, when there is a deformation of the heating element 1 (for example along a 3D form of a surface component), the electrical conductors 6, 7 can adapt themselves without excessive stresses acting on the electrical conductors 6, 7 and without tearing of the electrical conductors 6, 7 being able to occur, or a displacement of the electrical conductors 6, 7, which in the worst case could bring about contact of the electrical conductors 6, 7 with one another.

Figure 6:
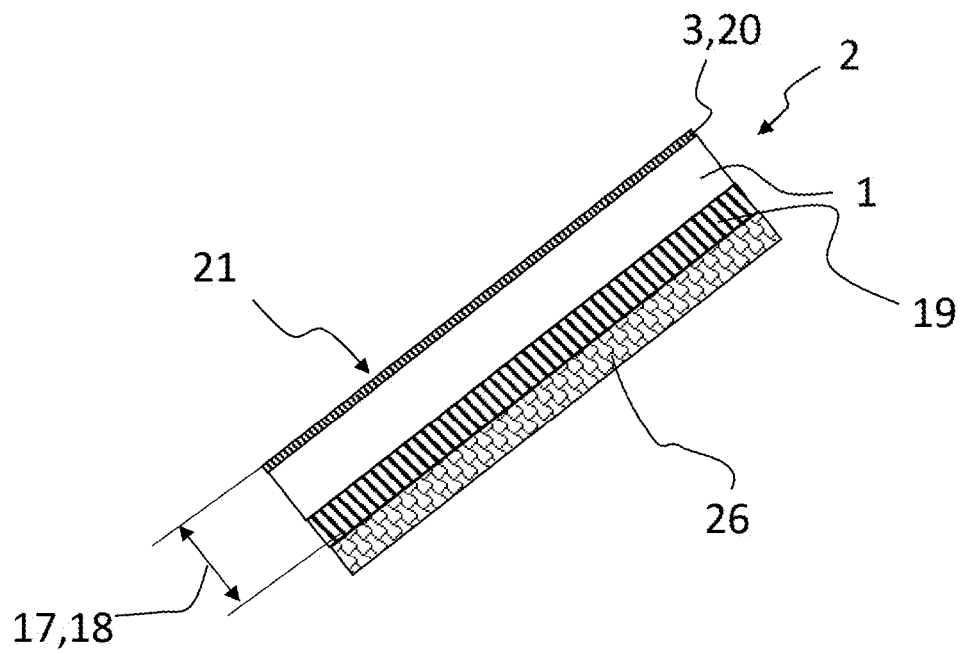
FIG. 6: schematically shows a wall construction of a surface component, FIG. 7 schematically shows a motor vehicle with described heating elements, and FIG. 8 schematically shows a described heating element with two segments.

FIG. 6 shows a construction of a wall 17 of the surface component 2 with a described heating element 1 along the wall thickness 18 of the wall 17. It can be seen that the heating element 1 is applied to a carrier material 19, to be precise on the side of a visible surface 21 of the surface component 2 that is oriented towards the passenger compartment of a motor vehicle. Also shown here is a decorative layer 20, which is applied to the visible surface 21, and also an insulating material 26, which is arranged on the opposite side of the surface component 2. The decorative layer 20 may for example form an inner surface 2 in a motor vehicle.

Figure 7:
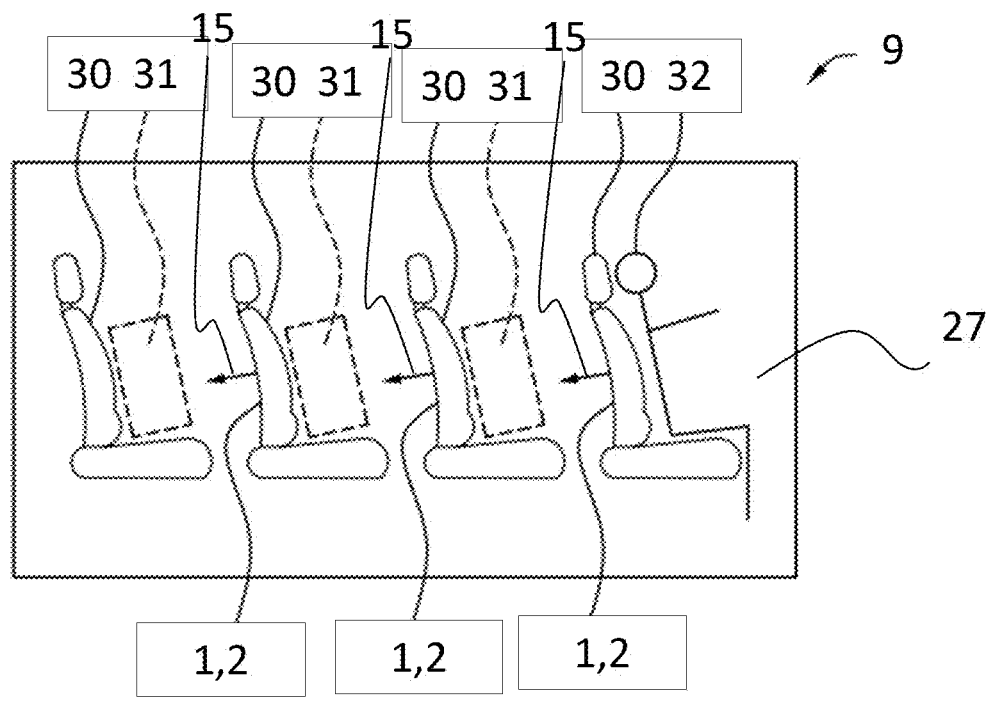

FIG. 7 shows a motor vehicle 9 in which the described heating elements 1 are used in surface components 2. It can be seen that the normal direction, respectively indicated by an arrow, of a visible surface of the surface components 2 is oriented towards an occupied region 31 for an occupant 32 in the motor vehicle 9. Furthermore, according to the representation that is shown in FIG. 4, the surface component 1 is oriented in such a way that a normal direction oriented perpendicularly to the visible surface intersects the occupied region 31. The surface components 2 with the heating elements 1 are arranged here in each case on the rear sides of seats 30 in the motor vehicle 9.

FIG. 8 shows a heating element 1 with two segments 33, 34, which are heatable independently of one another. FIG. 8 shows in this connection a possible arrangement of a number of electrical conductors 6, 7, 10 in two heating segments 33, 34. The two heating segments 33, 34 share a conductor 10 with a pole 28 (negative pole). This makes it possible for the two heating segments 33, 34 to be switched on independently of one another, with lower complexity of the connection (for example three cables instead of four cables). Alternatively, it is also possible that conductor 6 and conductor 7 are first connected to one heating segment, which, with the same power supplied to a greater surface area, would however lead to a consequently smaller area output. This can reduce the inrush-current behaviour, and provide a preheating of the heating systems, before the full output can be accessed by switching over two heating segments (conductor 6+conductor 10 and conductor 7+conductor 10).

LIST OF REFERENCE SIGNS

1 Heating element
2 Surface component
3 Inner surface
4 Film
5 Polymer material
6 First electrical conductor
7 Second electrical conductor
8 Carrier film
9 Motor vehicle
10 Third electrical conductor
11 Unused film region
12 Unused field region
13 Field lines
14 Surface area
15 Normal direction
16 Parallel plane
17 Wall
18 Wall thickness
19 Carrier material
20 Decorative layer
21 Visible surface
22 First direction
23 Second direction
24 First curvature
25 Second curvature
26 Insulating material
27 Adhesive
28 Terminal contact
29 Distance
30 Seat
31 Occupied region
32 Occupant
33 First heating segment
34 Second heating segment

What is claimed is:

1. A heating element for a surface component for forming an inner surface in a vehicle, the heating element comprising:
   at least one film of an electrically conductive polymer material with a two-dimensionally formed electrical conductivity that provides a conductive surface area, and
   at least two electrical conductors,
   wherein the at least two electrical conductors are at least in certain portions spaced apart from one another and run in parallel to each other, maintaining an electric conduction to the electrically conductive polymer material such that electrical power can be applied to the electrically conductive polymer material two-dimensionally by way of the at least two conductors,
   wherein each of the at least two electrical conductors are formed in more than one contact arm,
   wherein the at least one film has a thickness of between 100 μm and 2000 μm, and
   wherein the surface component is an interior panelling or a trim,
   wherein the heating element comprises curvatures in two directions, the curvatures comprise a first curvature in a first direction and a second curvature in a second direction perpendicular to the first direction such that the heating element has a complex deformation that follows a 3D-form of the surface component.

2. The heating element according to claim 1, wherein the electrically conductive polymer material has PTC properties and has a switching temperature in a range between 40° C. and 150° C.

3. The heating element according to claim 1, wherein the at least two electrical conductors are applied to a carrier film that is connected to the at least one film of the electrically conductive polymer material.

4. The heating element according to claim 3, wherein the carrier film has a plurality of interruptions.

5. The heating element according to claim 3, wherein the at least two electrical conductors are stitched, sewn, glued, laminated, rolled or applied by a printing process to the carrier film.

6. The heating element according to claim 1, wherein the at least two electrical conductors are stitched, sewn, glued, laminated, rolled or applied by a printing process to the at least one film of the electrically conductive polymer material.

7. The heating element according to claim 1, wherein the heating element is formed by at least two of the at least one film of the electrically conductive polymer material, which are arranged one on top of the other, the at least two electrical conductors being arranged between the two films.

8. A heatable surface component for the passenger compartment of a motor vehicle comprising:

the at least one heating element according claim 1, and a carrier material, wherein the at least one heating element is connected to the carrier material such that there is a surface contact between the heating element and the carrier material.

9. The heatable surface component according to claim 8, wherein the heating element is divided into a number of segments, which can be individually or jointly controlled.

10. The heatable surface component according to claim 8, wherein the heating element has a directed heat emission to the passenger compartment by the averted side being insulated.

11. The heatable surface component according to claim 8, wherein the carrier material is a fibre mat consisting of synthetic fibres or natural fibres.

12. The heating element according to claim 1, wherein a distance between the at least two conductors in a region where they are fixed in parallel electrically conducting manner to the electrically conductive polymer material is between 2 mm and 5 mm.

13. The heating element according to claim 1, wherein a distance of respective contact arms running in parallel to each other deviates (locally) by a maximum of 10% from an average distance therebetween.

14. The heating element according to claim 1, wherein the at least one film makes up a proportion by mass of at least 50 percent of the heating element.

15. The heating element according to claim 1, wherein there are surface bonds between the electrically conductive polymer material and the electrical conductors in the region of contact of the at least one film of electrically conductive polymer material and the at least two electrical conductors.

16. The heating element according to claim 1, wherein said at least two electrical conductors are laminated or rolled to said at least one film of the electrically conductive polymer material.

17. The heating element according to claim 1, wherein said at least two electrical conductors are applied by a printing process to said at least one film of the electrically conductive polymer material.

* * * * *